US012000412B2

(12) United States Patent
Reinertz et al.

(10) Patent No.: US 12,000,412 B2
(45) Date of Patent: Jun. 4, 2024

(54) GAS-POWERED DRIVE SYSTEM AND OPERATING METHOD

(71) Applicant: Rheinisch-Westfälische Technische Hochschule (RWTH) Aachen Körperschaft des öffentlichen Rechts, Aachen (DE)

(72) Inventors: Olivier Georg Reinertz, Kettenis (BE); Katharina Schmitz, Aachen (DE)

(73) Assignee: RHEINISCH-WESTFAELISCHE TECHNISCHE HOCHSCHULE (RWTH) AACHEN KOERPERSCHAFT DES OEFFENTLICHEN RECHTS, Aachen (DE)

( * ) Notice: Subject to any disclaimer, the term of this patent is extended or adjusted under 35 U.S.C. 154(b) by 0 days.

(21) Appl. No.: 18/024,789

(22) PCT Filed: Sep. 6, 2021

(86) PCT No.: PCT/EP2021/074528
§ 371 (c)(1),
(2) Date: Mar. 6, 2023

(87) PCT Pub. No.: WO2022/049298
PCT Pub. Date: Mar. 10, 2022

(65) Prior Publication Data

US 2023/0304514 A1 Sep. 28, 2023

(30) Foreign Application Priority Data

Sep. 7, 2020 (DE) ..................... 10 2020 123 331.0

(51) Int. Cl.
*F15B 11/044* (2006.01)
*F15B 11/05* (2006.01)
(Continued)

(52) U.S. Cl.
CPC ............ *F15B 11/044* (2013.01); *F15B 11/05* (2013.01); *F15B 11/064* (2013.01);
(Continued)

(58) Field of Classification Search
CPC ....... F15B 11/044; F15B 11/05; F15B 11/064; F15B 2211/46; F15B 2211/455; F15B 2211/528
See application file for complete search history.

(56) References Cited

U.S. PATENT DOCUMENTS 4,175,473 A * 11/1979 Izumi ..................... F15B 11/02 91/443
4,287,812 A 9/1981 Izumi
(Continued)

FOREIGN PATENT DOCUMENTS

DE 10 2009 001 150 A1 9/2010
FR 2 738 040 A1 2/1997
(Continued)

OTHER PUBLICATIONS

Stephan Merkelbach, et al., "Pneumatische Und Elektro-Mechanische Linearantriebe-Ein Vergleich Der Tco", O+P Fluidtechnik Aug. 7, 2017, pp. 1-9.
(Continued)

*Primary Examiner* — Thomas E Lazo
(74) *Attorney, Agent, or Firm* — Norris McLaughlin, P.A.

(57) ABSTRACT

A gas-powered drive system has a drive which includes a first chamber and a second chamber which are separated from one another by a piston. One of the chambers is connected to a gas source to drive the work element and the other chamber is connected via an exhaust air throttle to a gas sink by means of a reversing valve to movement of the piston. A control valve is assigned to the driving chamber through which the driving chamber can be filled with gas
(Continued)

Figure 1:
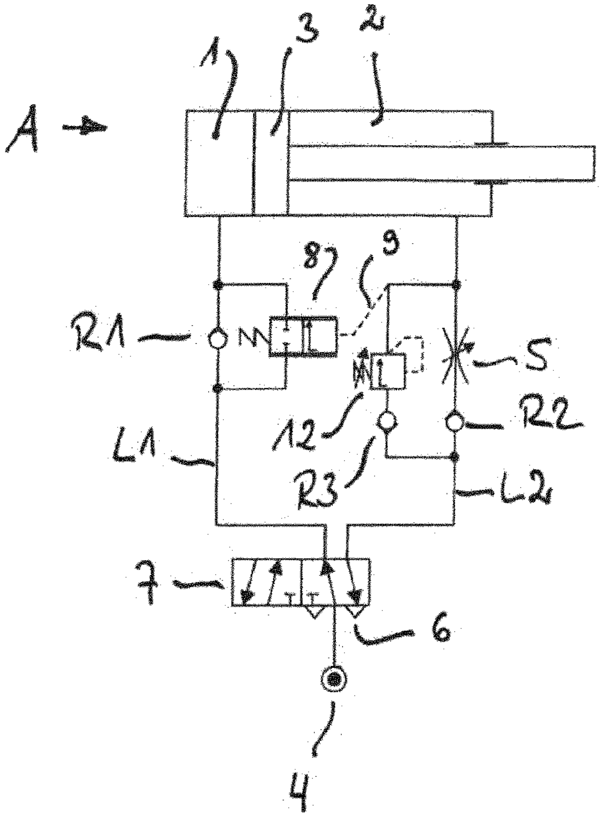

from the gas source. The opening cross-section of the control valve is set as a function of a control pressure.

13 Claims, 7 Drawing Sheets

(51) Int. Cl.
*F15B 11/064* (2006.01)
*F15B 13/044* (2006.01)
(52) U.S. Cl.
CPC ....... *F15B 13/044* (2013.01); *F15B 2211/526* (2013.01); *F15B 2211/6653* (2013.01)

(56) References Cited

U.S. PATENT DOCUMENTS

| | | | | |
|---|---|---|---|---|
| 7,353,744 | B2 * | 4/2008 | Dixen | F15B 11/05 91/446 |
| 7,392,734 | B2 * | 7/2008 | Kawabuchi | F15B 11/044 91/467 |
| 8,146,481 | B2 | 4/2012 | Hoshino et al. | |
| 2005/0257519 | A1 * | 11/2005 | Jensen | F15B 11/05 60/466 |
| 2006/0156914 | A1 * | 7/2006 | Dixen | F15B 11/05 91/444 |

FOREIGN PATENT DOCUMENTS

| | | |
|---|---|---|
| JP | S54-101070 U | 7/1979 |
| RU | 2 685 167 C1 | 4/2019 |

OTHER PUBLICATIONS

Eneffah, Energieeffizienz in der Produktion im Bereich Antriebs- und Handhabungstechnik, Brosch-EnEffAH-5-v Apr. 11, 2012, 12:02, 64 pages.
Die Weltneuheit: EARS-System revolutioniert die Druckluftweltl, Katalog, 22 pages.
Andreas Druegemoeller, et al., "Energieeffizienz mechatronischer Systeme ist unschlagbar", Elektromechanischer Antrieb, Mar. 21, 2007, 6 pages.
Yeming Zhang, et al., "Study of Cost and Energy Consumption for Pneumatic Actuator and Electric Actuator", 7th International Fluid Power Conference, Aachen 2010, pp. 1-16.
Maximilian Waerder, et al., "Carbon Footprint Determination of an Electro-Hydraulic Compact Axle (EHA) Based on DIN EN ISO 14067", The Sixteenth Scandinavian International Conference on Fluid Power, May 22-23, 2019, Tampere, Finland.
Fan Yang, et al., "Analysis of the Energy Efficiency of a Pneumatic Booster Regulator with Energy Recovery", Applied Sciences, 2017, 7, 816, pp. 1-19.
Christian Von Grabe, et al., "Efficiency Improvements by Air Recuperation Using the Example of a Pick-and-Place- Application", Proceedings of the 9th JFPS International Symposium on Fluid Power, Matsue, 2014, Oct. 28 -31, 2014, pp. 361-367.
Yan Shi, et al., "Flow Characteristics of Expansion Energy Used Pneumatic Booster", Chinese Journal of Mechanical Engineering, vol. 25, No. 5, 2012, pp. 889-896.
D. Seslija, et al., "Cost Effectiveness Analysis of Pressure Regulation Method on Pneumatic Cylinder Circuit", International Energy Journal 17 (2017), pp. 89-98.
Dr. Oliver Reinertz, et al., "Efficiency Optimized Pneumatic Pressure Booster", Proceedins of the ASME/BATH 2019 Symposium on Fluid Power and Motion Control, pp. 1-8.
Elvira Rakova, et al., "Comparison of Methods for the Investigation on the Energetic Behaviour of Pneumatic Drives", The 9th International Fluid Power Conference, 9. IFK, Mar. 24-26, 2014, Aachen, Germany, 13 pages.
Adrian Raisch, et al., "Saving Energy by Predictive Supply Air Shutoff for Pneumatic Drives", 2018 European Control Conference (ECC), Jun. 12-15, 2018, Limassol, Cyprus, pp. 965-970.
Peter Radgen, et al., "Compressed Air Systems in the European Union, Energy, Emissions, Savings Potential and Policy Actions", pp. 1-162, 2001.
Miroslav Novakovic, et al., "Impact of Capturing Used Air on the Dynamics of Actuator Drive", CEAI, vol. 17, No. 2, pp. 82-89, 2015.
Hiroshi Mutoh, et al., "An Approach To Energy Conservation in Pneumatic Systems With Meter out Circuit", Proceedings of the 7th JFPS International Symposium on Fluid Power, Toyama 2008, Sep. 15-18, 2008, pp. 765-770.
Stephan Merkelbach, et al., "Control Concept for a Novel of Integrated Pressure Booster", Proceedings of 2017 International Conference on Hydraulics and Pneumatics—Hervex, Nov. 8-10, Baile Govora, Romania, pp. 25-34.
Xing Luo, et al., " Study of Pneumatic-electrical System for Exhaust Air Energy Recovery", International Journal of Energy Engineering (IJEE), Dec. 2013, vol. 3, Iss. 6, pp. 228-238.
Yuko Kawakami, et al., "Application of Energy-saving to Pneumatic Driving Systems", Fluid power. Forth JHPS International Symposium 1999 JHPS, pp. 201-206.
J. Hepke, et al., "Energy saving measures on pneumatic drive systems", The 13th Scandinavian International Conference on Fluid Power, SICFP2013, Jun. 3-5, 2013, Linkoeping, Sweden, pp. 475-483.
Matthias Doll, et al., "Energy Optimal Open Loop Control of Standard Pneumatic Cylinders", 7th International Fluid Power Conference, Aachen 2010, pp. 1-12.
Matthias Doll, et al., "Energy Efficient Use of Compressed Air in Pneumatic Drive Systems for Motion Tasks", FPM 2011, pp. 340-345.
Joshua J. Cummins, et al., "Modeling of a Pneumatic Strain Energy Accumulator for Variable System Configurations With Quantified Projections of Energy Efficiency Increases", Proceedings of the ASME/BATH 2015 Symposium on Fluid Power and Motion Control, FPMC2015, Oct. 12-14, 2015, Chicago, Illinois, USA, pp. 1-8.
Festo, Energieeffizienz@Festo, Sep. 2019, 60 pages.
Leitfaden Druckluft-Optimierung, Informationen fuer den Druckluft-Verantwortlichen, www.druckluft.ch, Aug. 2015, 12 pages.
Stephan Merkelbach, et al., "Pneumatische Und Elektro-Mechanische Linearantriebe-Ein Vergleich DER TCO", O+p. Fluidtechnik Jul. 8, 2017, pp. 1-9.
Steffen Huelsmann, et al., "Energieeffiziente Antriebstechnik in Der Produktion", O+p. Fluidtechnik Oct. 2019, pp. 46-51.
EnEffaH, Energieeffizienz in der Produktion im Bereich Antriebs- und Handhabungstechnik, Brosch-EnEffAH-5-v 11.04.12, 12:02, 64 pages.
Wolfgang Gauchel, "Energiesparende Pneumatik", O+P Jan. 2006, pp. 33-39.
Die Weltneuheit: EARS-System revolutioniert die Druckluftwelt!, Katalog, 22 pages.
Andreas Druegemoeller, et al., "Energieeffizienz mechatronischer Systeme ist unschlagbar", Elektromechanischer Antrieb, 21.03. 2007, 6 pages.

* cited by examiner

GAS-POWERED DRIVE SYSTEM AND OPERATING METHOD

The invention relates to a gas-powered drive system, comprising a drive comprising a first chamber and a second chamber, which are separated from one another by a movable work element of the drive, in particular by a piston, wherein one chamber of the two chambers can be connected to a gas source to form a chamber driving the work element, and the other chamber of the two chambers can, at the same time, be connected via an exhaust air throttle to a gas sink, in particular by means of a reversing valve, to form a chamber counteracting the movement of the work element.

In the process, the gas escaping through the exhaust air throttle preferably also flows through a check valve that opens in the direction toward the gas sink. This has the advantage that the gas cannot/does not need to flow through the exhaust air throttle in a return stroke of the work element, but can be guided past the exhaust air throttle in parallel therewith, possibly through other system components, in particular while bypassing the exhaust air throttle.

The invention furthermore relates to a method for operating a gas-powered drive system, comprising a drive comprising a first chamber and a second chamber, which are separated from one another by a movable work element of the drive, in particular by a piston, wherein one chamber of the two chambers is connected to a gas source to form a chamber driving the work element, and the other chamber of the two chambers, at the same time, is connected via an exhaust air throttle to a gas sink, in particular by means of a reversing valve, to form a chamber counteracting the movement of the work element.

Drive systems and methods of this type are generally known in the prior art. For example, DE 10 2009 001 150 A1 describes the throttling of pneumatic cylinders in general terms.

Typical drives of such a system are, for example, cylinder-piston assemblies, in which the piston, serving as a work element, is disposed between the chambers and can be subjected to gas pressure on both sides from the direction of each of the two chambers.

The gas used can, for example, be conventional air, without the invention being limited thereto.

The customary mode of operation is that pressurized gas from a gas source, which provides gas having a pressure greater than the ambient atmospheric pressure, for example a compressor, is conducted into one of the chambers, whereby a force moving the work element is exerted on the work element. This chamber thus forms a driving chamber. Gas is displaced from the other chamber as a result of the movement. The gas pressure prevailing there exerts a force on the work element which counteracts the movement. This chamber, from which gas is displaced during the movement of the work element, forms the counteracting chamber. The magnitude of the counteracting force can be influenced by throttling the gas flow from the counteracting chamber in the direction toward a gas sink, for example, for simplicity, the environment, using an exhaust air throttle. Within the meaning of the invention, the exhaust air throttle is also referred to in this way when the gas used is not air, since this term has become established in the relevant terminology.

In the prior art and also in the invention, the exhaust air throttle is preferably set, in particular with respect to the pressure dropping across the exhaust air throttle, so that a so-called supercritical flow of the gas through the exhaust air throttle results. For example, this can usually be achieved when the input-side pressure upstream from the exhaust air throttle is at least 2 times greater than the output-side pressure downstream from the exhaust air throttle. The pressures mentioned here and hereafter shall be understood to mean absolute pressures.

In the case of supercritical flow, the flow velocity reaches the speed of sound, which yields the advantage that the speed of the work element, for example of the piston in a pneumatic cylinder, is load-independent in the quasi-stationary state. The invention can likewise provide a subcritical flow, in which the speed of sound is not reached.

The problem with this operating mode is that this is not favorable in terms of energy, since the driving chamber is always placed under maximum gas pressure.

In principle, it is also known to throttle the inflow of gas into the driving chamber, as an alternative to exhaust air throttling. Although this interconnection known as supply air throttling is more favorable in terms of energy, the speed of the work element in the drive is not load-independent in such a case, since, even though the inflowing gas mass flow is load-independent at a constant supply pressure even when the flow through the supply air throttle is supercritical, the constant mass flow results in the speed of the work element in the drive being load-dependent due to the load-dependent gas density in the drive chamber.

It is the object of the invention to refine a system and a method of the type mentioned above so that an more energetically favorable operating mode of an exhaust air-throttled system can be achieved, preferably while furthermore achieving a supercritical flow in the exhaust air throttle so as to obtain a preferred load-independent movement of the work element.

This object is achieved, in the system, in that a control valve is assigned to the driving chamber, through which the driving chamber can be filled with gas from the gas source, wherein the opening cross-section of the control valve can be set as a function of a control pressure prevailing upstream from the exhaust air throttle in the flow direction, or a control pressure dropping across the exhaust air throttle, in particular wherein the opening cross-section can be increased by way of the control valve when a drop below a first limit pressure has occurred as the control pressure falls, and the opening cross-section can be decreased, and in particular the control valve can be closed, when a drop below a second limit pressure has occurred as the control pressure falls further.

In the method, the object is achieved in that a control valve is assigned to the driving chamber, through which the driving chamber is filled with gas from the gas source, wherein the opening cross-section of the control valve is set as a function of a control pressure prevailing upstream from the exhaust air throttle in the flow direction or a control pressure dropping across the exhaust air throttle, in particular so that the opening cross-section is increased by way of the control valve when the falling control pressure drops below a first limit pressure, and the opening cross-section is decreased, and in particular the control valve is closed, when the further falling control pressure drops below a second limit pressure.

The invention can preferably provide that, when a control pressure is present which is greater than the first limit pressure, the control valve is initially closed, which is to say, the control valve opens only when a drop below the first limit pressure occurs and increases the opening cross-section as the control pressure falls further.

Likewise, it may preferably be provided that, as the control pressure falls further, the maximum opening cross-section is reached between the two limit pressures, however at the latest when the second limit pressure is reached. As the control pressure falls further, the opening cross-section of the control valve is decreased once a drop below the second limit pressure occurs, in particular until the control valve is closed at a third limit pressure.

Likewise, it may be provided that, when the first limit pressure is present, the control valve is already partially opened and also does not close entirely when the control pressure rises further.

In all embodiments, it may preferably be provided that the control valve increases the opening cross-section as the control pressure falls, and decreases the opening cross-section as the control pressure rises, in the range between the first and second control pressures. Likewise, it may preferably be provided in all embodiments that the control valve decreases the opening cross-section as the control pressure falls, and increases the opening cross-section as the control pressure rises, in the range between the second and third control pressures.

The respective change in the opening cross-section is dependent on the change in the control pressure, and in particular also on the sign thereof. This dependence may be linear, but does not have to be. A non-linear dependence between the change in control pressure and the change in opening cross-section may also be provided.

Preferably, a check valve that opens in the direction toward the driving chamber is situated in the flow path of the gas in series with the control valve. As an alternative, a check valve that blocks in the direction toward the driving chamber is situated in parallel with the control valve.

The inflow of the gas into the chamber thus takes place through the control valve, while a return flow, for example during a return stroke of the work element, takes place bypassing the control valve, in particular when the control valve is closed due to the switched position thereof during the return stroke.

The advantage of the invention is that a first limit pressure can be selected, which ensures that the exhaust air throttle is operated at a desired differential pressure level above the exhaust air throttle. When a drop below the limit pressure occurs, the control valve opens, and more gas can flow into the driving chamber so as to maintain the desired pressure condition. In this way, the pressure can be regulated to the desired level.

By furthermore taking a second limit pressure into consideration, which is below the first limit pressure, it is possible to take into account that, at the end of the possible stroke travel of a work element, the pressure in the counteracting chamber falls further, and in particular also could not be increased by further opening of the control valve, so that the invention provides decreasing the opening cross-section, and preferably closing the control valve entirely. In particular, the work element reaching a standstill at the end of the stroke can thus be the event that triggers the closing of the control valve. The work element is thus disconnected from the pressure source.

When the drive, in particular the cylinder, works against a comparatively low external load, and a low pressure differential at the work element is consequently sufficient for carrying out the task, the driving chamber, in contrast to conventional exhaust air-throttled systems, is not fully brought to the supply pressure of the system, but is only filled with the volume of air that results in a pressure which is slightly higher than the pressure necessary for carrying out the task, while preserving supercritical flow at the exhaust air throttle.

A return stroke of the work element is enabled, for example, in particular after switchover by means of a reversing valve, by supplying gas, preferably while bypassing the exhaust air throttle, into the previously counteracting and now drivingly acting chamber, wherein, during the return stroke, the gas is conducted from the previously driving and now counteracting chamber, bypassing the closed control valve, for example through a check valve that opens during the return stroke. The gas inflow can take place during the return stroke, for example by way of a pressure regulating valve, and in particular a pressure reducer, which is situated in parallel with the exhaust air throttle in terms of flow and, for example, is furthermore situated in series with respect to a check valve that opens in the direction toward the chamber.

When the third limit pressure is exceeded in the chamber currently to be filled, the control valve is returned into a position that, again, is at least partially open so that a renewed working stroke of the work element can be carried out, in particular under adjustment of the desired control pressure in the range of the first limit pressure or in the range between the first and second limit pressures.

The invention preferably provides for the first limit pressure to be greater, and for the second limit pressure to be smaller, than a pressure that prevails upstream from the exhaust air throttle or drops across the exhaust air throttle, which is necessary for supercritical gas flow in the exhaust air throttle. This required pressure can be 2 bar, for example, of absolute pressure. In this way, it can be ensured that, when the opening cross-section of the control valve is regulated based on the control pressure around the first limit pressure or in the range between the first and second limit pressures, the pressure present upstream from, or dropping across, the exhaust air throttle is always such that the throttle is operated in supercritical flow, in particular, specifically, until the end of the stroke has been reached, and the control valve closes, preferably as the control pressure drops below the second limit pressure and reaches the third limit pressure.

The first limit pressure is preferably 1% to 25% greater than the pressure necessary for the supercritical flow, wherein, for example, the necessary pressure can usually be 2 bar. Due to the required regulating range below the first limit pressure, a value of 2.3 bar is preferred for the first limit pressure. Further preferably, the second limit pressure is at least 5% to 50% lower than the pressure necessary for the supercritical flow and is preferably 1.5 bar. The third limit pressure is preferably only slightly below the second limit pressure. Actual valve designs, however, usually have larger regulating ranges, so that a third limit pressure of, for example, 1.3 bar is realistic given the aforementioned values, and is easily achievable in terms of fluid mechanics. All aforementioned pressure information for the limit values and the pressure necessary for the supercritical flow shall preferably be understood to have a possible variation of plus/minus 10% of the aforementioned value.

One option for controlling the control valve or the valve actuator present therein with respect to the opening cross-section may be that the system comprises an electronic/electric controller, by way of which the control pressure can be measured, for example by way of a pressure sensor in a gas line section between the counteracting chamber and the exhaust air throttle, and by way of which an electrical valve drive for adjusting the valve actuator in the control valve can be activated as a function of the measured value of the control pressure. The valve drive can thus be driven so as to move the valve actuator in a first direction for increasing the opening cross-section, in particular as the control pressure falls, when the control pressure drops below the first limit value, and to move the valve actuator, in particular in a second direction opposite the first direction, for decreasing the opening cross-section when the further falling control pressure drops below the second limit value, in particular at the end of the stroke of the work element.

Such a type of control, however, requires an active component, here the electronic controller.

One embodiment that is preferred over this design may, in contrast, provide that the movement of the valve actuator is carried out in a purely gas-powered manner, so that an additional electronic controller can be dispensed with.

Preferably, a gas line is provided for this purpose, by way of which the control valve is fluidically connected to the counteracting chamber, wherein the control pressure acting in the gas line acts on the valve actuator of the control valve. In this way, a force positioning the valve actuator is exerted directly by the control pressure.

Preferably, it may be provided that the valve actuator is prestressed with an actuating force, for example by means of a spring engaging on the valve actuator, by which the valve actuator can be displaced as the control pressure falls.

In principle, it is achieved, in this purely fluidic control, that the opening cross-section of the control valve is increased in a pressure range between the first and second limit pressures, as the control pressure falls, by the movement of the valve actuator, and the opening cross-section of the control valve is decreased in a pressure range below the second limit pressure, as the control pressure falls further, by the movement of the valve actuator, until the opening cross-section is preferably closed entirely when the third limit pressure is reached.

It may be provided that the valve actuator is moved in the same direction in the pressure range between the first and second limit pressures, and in the pressure range below the second limit pressure, thus, in particular, both during the initially effectuated increase in the opening cross-section and during the subsequently effectuated decrease in the opening cross-section. This is particularly advantageous since the consecutive actions are both causally related to the falling control pressure.

This can preferably be achieved when the control valve has a characteristic curve that describes the dependence on the opening cross-section and adjustment travel, which has a reversing slope at an adjustment travel position between the two possible extremal adjustment travel positions. For example, a slope reversal in the characteristic curve may be present at the location at which the second limit pressure is reached.

It may also be provided that an area in which the slope has the value "zero" is present between two areas of the characteristic curve having opposite slope signs.

For example, it may be provided that the control valve comprises two control edges in the valve body which cooperate with the valve actuator, or two control edges disposed on separate valve actuators connected in series, in particular wherein the opening cross-section can be increased, in a direction of movement of the valve actuator defined by a falling control pressure, in a first movement section, by cooperation with the first control edge, and the opening cross-section can be decreased, in a following second movement section, in the same movement direction, by cooperation with the second control edge, in particular until the opening cross-section is entirely closed.

As was already mentioned above, a pressure regulating valve, in particular a pressure reducer comprising a check valve, can be connected in parallel with the exhaust air throttle that is assigned to the counteracting chamber, by way of which the counteracting chamber can be filled with gas, in particular while the exhaust air throttle is being blocked.

In a possible configuration of the invention, the invention can provide that a reversing valve is provided in the line region between the control valve and the drive, as well as between the exhaust air throttle and the drive, by way of which, in a first switched stage, the first chamber can be connected to the control valve and, at the same time, the second chamber can be connected to the exhaust air throttle, and, in a second switched stage, the second chamber can be connected to the control valve and, at the same time, the first chamber can be connected to the exhaust air throttle.

In this embodiment, it can furthermore be provided that the system comprises only one exhaust air throttle and only one control valve, wherein these cooperate with a respective chamber by way of switchover, both during the working stroke and during the return stroke.

In this possible configuration, the exhaust air throttle is preferably always connected downstream to the pressure sink, and the control valve is always supplied on the input side with gas from the pressure source.

Further preferably, a pressure regulating valve, preferably a pressure reducing valve, is situated in parallel with the control valve, by way of which a minimum driving chamber pressure is ensured at all times, bypassing the control valve which is in the closed position at the end of a working stroke. If the reversal of the movement direction of the drive is initiated by switchover of the reversing valve, sufficient pressure is thus always available in the previously driving chamber, so that, due to decompression of the chamber now counteracting the movement, pressure build-up occurs upstream from the exhaust air throttle, which, via the control line and the force thereby exerted on the valve actuator in the control valve, causes the control valve to open, whereby a subsequent pressure-regulated working stroke in the opposite direction is made possible. This pressure regulating valve is, in particular, provided for ramping up the drive system from a completely depressurized state.

Another embodiment can also provide that a respective assembly comprising an exhaust air throttle and a control valve, including a control line connected to the other chamber, is assigned to each of the two chambers, wherein each of the two chambers can be filled with gas by the assigned control valve during a process phase during which the particular chamber acts as the driving chamber, and each of the two chambers can be emptied by the assigned exhaust air throttle during a process phase during which the particular chamber acts as a counteracting chamber, in particular wherein, in both process phases, the respective stroke of the work element is carried out with the described pressure regulation by way of the currently active control valve.

In this embodiment, in each case one of the assemblies can be connected to the pressure source, the other assembly being connected to the pressure sink at the same time, by means of a reversing valve.

By using check valves in each of the two assemblies, it can preferably be achieved that, when a respective assembly is connected to the pressure source, the gas flows via the control valve in the direction toward the chamber to be filled, and a flow of gas via the exhaust air throttle is prevented, wherein, conversely, when a connection to the pressure sink takes place, gas flows via the exhaust air throttle to the pressure sink, and a flow of gas via the control valve is prevented.

In a refinement, it may be provided that a pressure regulating valve, in particular a pressure reducer, is connected in parallel with at least one of the assemblies, preferably both assemblies, by way of which the system can be transferred from a state in which both chambers are pressure-relieved into an operating state, in particular by filling one of the two chambers with gas by way of the pressure regulating valve, while applying pressure to and opening the control valve assigned to the other chamber.

The invention can also provide that an assembly for applying a minimum pressure for starting up the system from a state in which both chambers are depressurized is integrated directly into the control valve.

The invention will be described in more detail hereafter based on the figures.

FIG. 1 shows a first embodiment of the invention comprising a cylinder-piston assembly A as a work element, the piston 3 of which separates two chambers 1 and 2. It is assumed here that the work element A carries out a working stroke when the piston rod of the piston 3 is being extended.

Using a reversing valve 7, a pressure source 4 can be selectively connected to a line L1 and, at the same time, a pressure sink 6 can be connected to a line L2, or vice versa. In this embodiment the pressure regulation according to the invention is carried out only during the working stroke, in particular so that the chamber 1 that is driving during the working stroke is only filled with gas via the control valve 8 to such an extent that a supercritical flow is present at the exhaust air throttle 5.

For this purpose, it is provided that the control valve 8, by way of which the chamber 1 is filled, is situated in the line L1 leading to the chamber 1 that is driving during the working stroke. A check valve R1 is disposed in parallel with the control valve, which prevents inflow into the chamber bypassing the control valve 8, but allows gas to flow out of the chamber 1 during the return stroke, in particular when the control valve 5 is then closed (as is shown here).

During the working stroke, gas is displaced from the chamber 2, which during the working stroke counteracts the movement of the piston 3, via the exhaust air throttle 5 and a check valve R2, which is disposed in series therewith and opens, in the direction of the pressure sink 6, to the pressure sink 6.

As an essential aspect according to the invention, the invention provides that a gas line 9, serving as a control line 9, connects the control valve 8 to a line section that is situated in the line L2 between the counteracting chamber 2 and the exhaust air throttle 5.

According to the invention, the control pressure acting in this line section, in particular essentially the pressure dropping across the exhaust air throttle 5, acts via the control line 9 on the valve actuator in the control valve 8 and can influence the position of the valve actuator, and thus the opening cross-section of the control valve 8, in such a way that, as the control pressure falls, the opening cross-section is increased when the control pressure drops below a first limit pressure, so that more gas flows into the driving chamber, and, when a further drop below a second limit pressure occurs, which is lower than the first limit pressure, the opening cross-section is decreased, and preferably closed entirely, in particular when a third limit pressure is reached, which is preferably lower than the second limit pressure.

In this way, the control pressure is maintained in the regulating range around the first limit pressure until a drop below the second limit pressure occurs. This can preferably be selected such that a supercritical flow is achieved in the exhaust air throttle, and the first limit pressure is thus greater than the minimum pressure that is required for the supercritical flow. The second limit pressure is preferably lower than this minimum pressure.

At the end of the stroke, the piston 3 is no longer able to displace gas from the chamber 2, so that the control valve 8 decreases the opening thereof, as a result of the control pressure dropping below the second limit pressure, until the valve closes, preferably when reaching or dropping below the third limit pressure.

A return stroke can be initiated by switching over of the reversing valve 7. In this illustrated case, connecting the pressure source 4 to the line L2 prompts the check valve R2 to close, and the check valve R3 to open, which is situated in series with respect to a pressure regulating valve 12 by way of which the chamber 2 is filled for the return stroke. The gas that is displaced from the chamber 1 can escape without impairment to the pressure sink 6, for example to the outside, via the open check valve R1. At the same time, the pressure build-up in the chamber 2 ensures that force is applied to the valve actuator in the control valve 8 via the control line 9, so that the same opens again, in particular when the third limit pressure is reached or exceeded, and initiates a subsequent working stroke. The pressure conditions required for cyclical working strokes are thereby maintained. The system can be started from an idle position by pressurizing the chamber 2.

Figure 2:
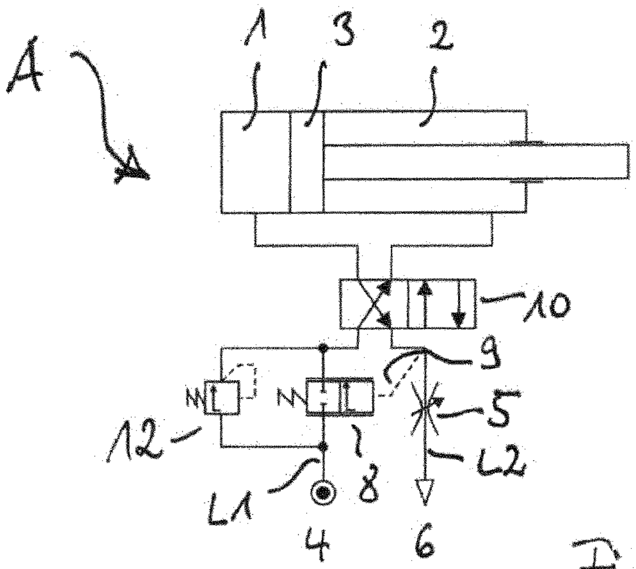

FIG. 2 shows an embodiment in which a pressure-regulated movement of the piston 3 takes place both during the working stroke and during the return stroke, based on the control pressure in the control line 9.

The control valve 8 is also provided in the line L1 here, which in this embodiment is permanently connected to the pressure source 4. The pressure sink 6 is permanently connected at the line L2 to the exhaust air throttle 5.

The essential difference compared to FIG. 1 is that the chamber 1 is now selectively connected to the control valve, and the chamber 2 is selectively connected to the exhaust air throttle, or vice versa, via the reversing valve. The above-described pressure regulation by way of the control valve 8 thus always takes place with respect to the currently driving chamber of the two chambers 1, 2, and the exhaust air throttle is always present for the gas that flows out of the presently counteracting chamber.

The pressure regulating valve 12 can be provided to achieve minimum filling of the formerly driving chamber, pressurization of the control line 9, and opening of the control valve 8 in an initial depressurized state of the two chambers, in the switched position shown here, with the control valve closed (at the end of the working stroke). The system is thus transferred to the regular operating state thereof again and can carry out a movement by switching over the reversing valve.

Figure 3:
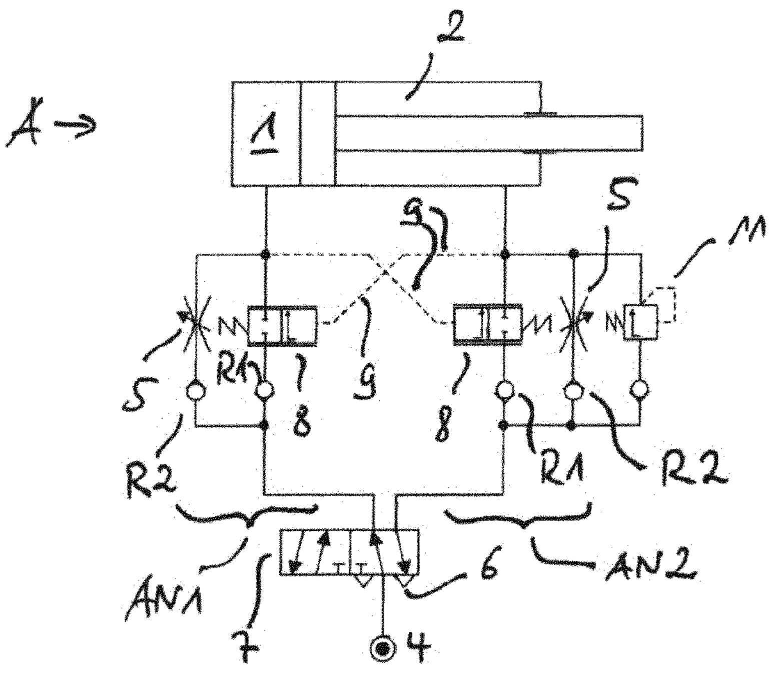

FIG. 3 shows another possible embodiment in which a respective assembly AN1 or AN2, comprising a control valve 8 and an exhaust air throttle 5, is assigned to each of the two chambers 1 and 2. The control line 9 of a control valve 8, which is assigned to a particular chamber, has a fluid connection to the respective other chamber.

The respective required flow direction is defined by the check valves R1, R2 in each of the assemblies AN1, AN2. In this way, R1 allows flow through the control valve 8 to the chamber and, at the same time, R2 blocks flow through the exhaust air throttle when the pressure source 4 is connected to the assembly AN1 or AN2, and R2 allows flow out of the chamber through the exhaust air throttle 5 and, at the same time, R1 blocks a flow through the control valve 8 when the pressure sink 6 is connected to the assembly AN1 or AN2.

By way of the reversing valve 7, connection of the pressure source 4 and the pressure sink 6 to one assembly AN1 or AN2 can be alternatingly carried out.

Using the same above-described effect, a pressure regulation van be carried out, during the working stroke and during the return stroke, or during reversing working strokes, which meets the desired pressure criterion during exhaust air throttling, and preferably supercritical flow.

Here, the invention can provide that a pressure regulating valve 11 comprising a check valve is situated in parallel with the assembly AN2, by way of which initial commissioning of the system can be carried out when both chambers are depressurized, as has been described above.

Furthermore, a pressure regulating valve can also be disposed in parallel with the assembly AN1, which is not shown.

Figure 4A:
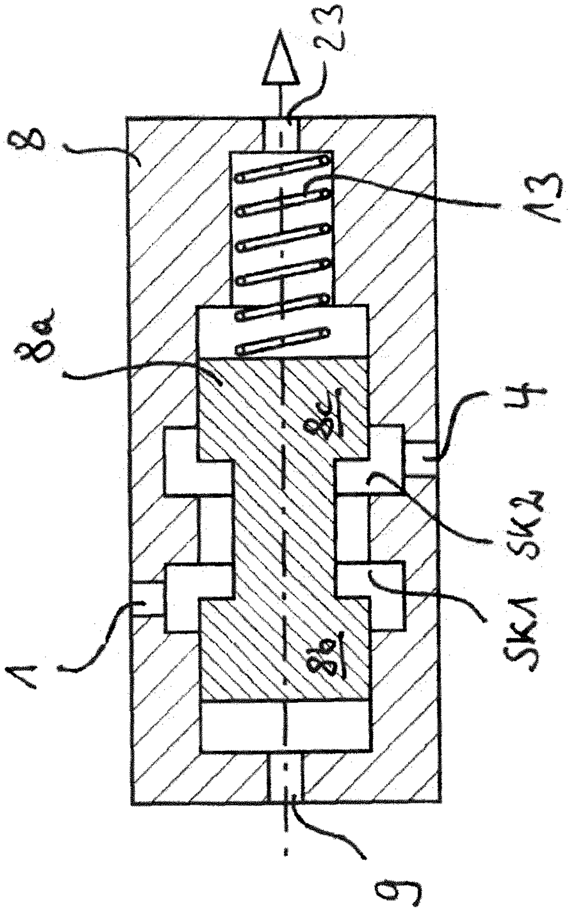
Figure 4B:
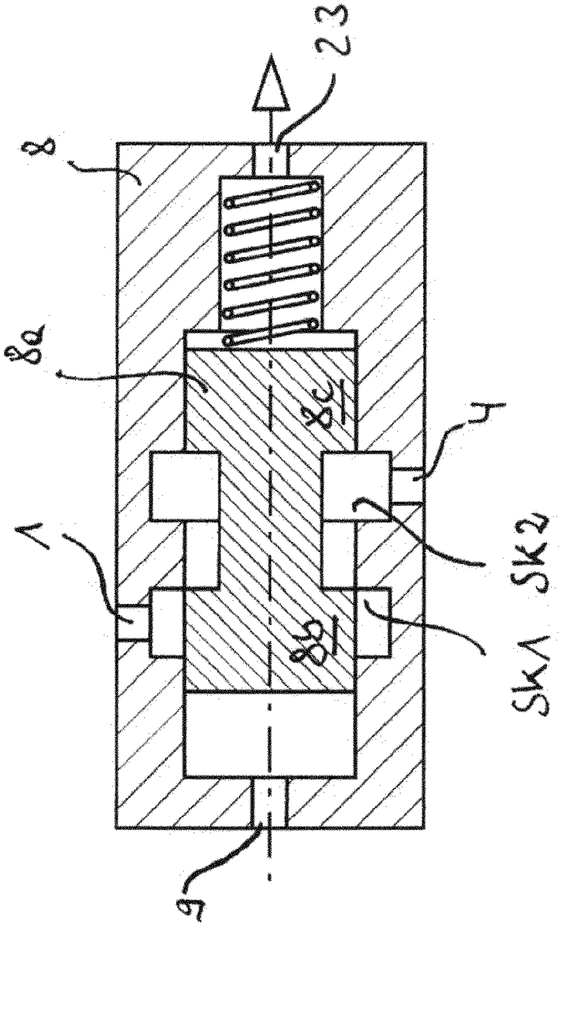

FIGS. 4*a* and 4*b* show a possible embodiment of a control valve 8 comprising a valve actuator 8*a*, which comprises two actuating bodies 8*b* and 8*c* that are connected by a reduced diameter region. Such a design of the valve actuator 8*a* can be provided in all possible embodiments of the valve 8. The valve actuator 8*a* is pressurized here on the left side by the control pressure from the control line 9, and is loaded here on the right by a force here a spring 13, which is disposed in a pressure-relieved space. As the control pressure in the line 9 falls, the valve actuator 8*a* is thus displaced to the left, based on this illustration. Action between the valve actuator 8*a* (the actuating body 8*b* thereof) and the control edge SK1 increases the opening cross-section, and action between the valve actuator 8*a* (the actuating body 8*c* thereof) and the control edge SK2 decreased the opening cross-section. The opening cross-section between the connections 4 (to the pressure source) and 1 (to the chamber/to the regulated volume) can thus be set as a function of the control pressure.

The aforementioned limit pressures can be defined by means of the spring 13, the force of which can be settable. On the right side, the control valve 8 is gas pressure-relieved at the connection 23. In all possible embodiments of a control valve, the second and third limit pressures may be dependent on the first and may be determined by the spring as well as the design of the control valve, in terms of the geometry of the control edges.

The illustration of FIG. 4*a* shows a position having a maximum opening cross-section, which may be found at a control pressure between the first and second limit pressures, or preferably at the second limit pressure. Preferably, as the control pressure rises and the first limit pressure is exceeded, the control valve can close, or initially decrease and then close the opening cross-section as the control pressure rises, in particular if no residual opening is provided, for example by a mechanical stop, or no parallel flow path is provided, and, according to the invention, can increase the opening cross-section up to the illustrated maximum open position when a drop below the first limit pressure occurs, as the control pressure falls. If the control pressure falls further, the opening cross-section is decreased until it closes at the control edge SK2.

FIG. 4*b* shows an embodiment of the same control valve from FIG. 4*a* in a position in which the first limit pressure can be present in the control line 9. In this case, the control valve is closed at the control edge SK1 and, proceeding from this position, would increase the opening cross-section from the closed position as the control pressure falls. Proceeding from this position, the control valve 8 would remain closed as the control pressure rises.

Figure 5:
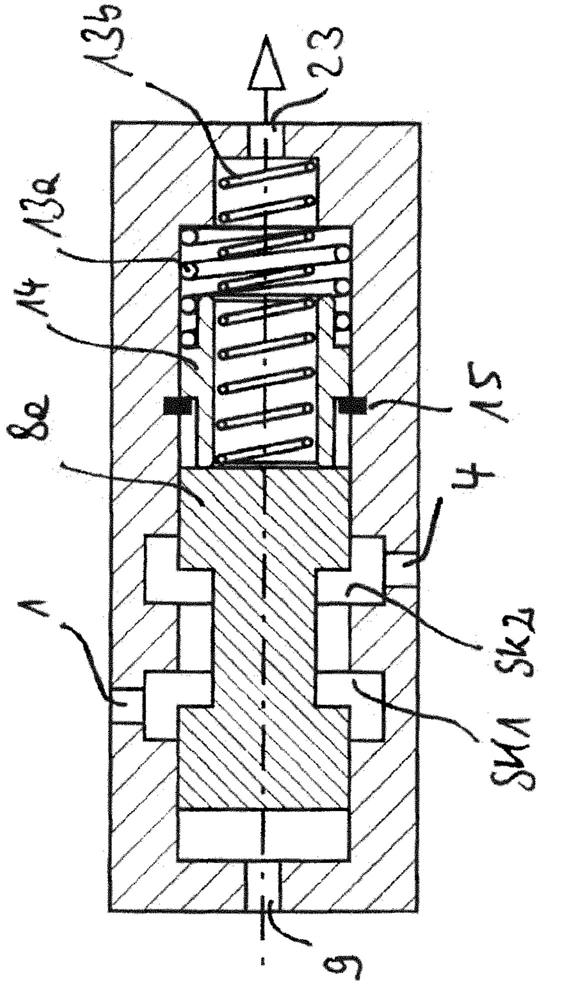

FIG. 5 shows an embodiment in which, in contrast to FIGS. 4*a* and 4*b*, two springs 13*a*, 13*b* are disposed coaxially inside one another. The spring 13*b* acts on the valve actuator 8*a*, and the spring 13*a* acts indirectly via the bearing element 14 which can be displaced into the stop 15. In this way, a first displacement range of the valve actuator 8*a* is defined, in which both springs cooperate, and a second displacement range, when the bearing element 14 is situated in the stop, in which only the spring 13*b* acts. The limit pressures and the slopes of the opening characteristics of the two control edges as a function of the control pressure can thus be decoupled from one another. The space in which the springs 13*a* and 13*b* are disposed is pressure-relieved via the connection 23.

Figure 6:
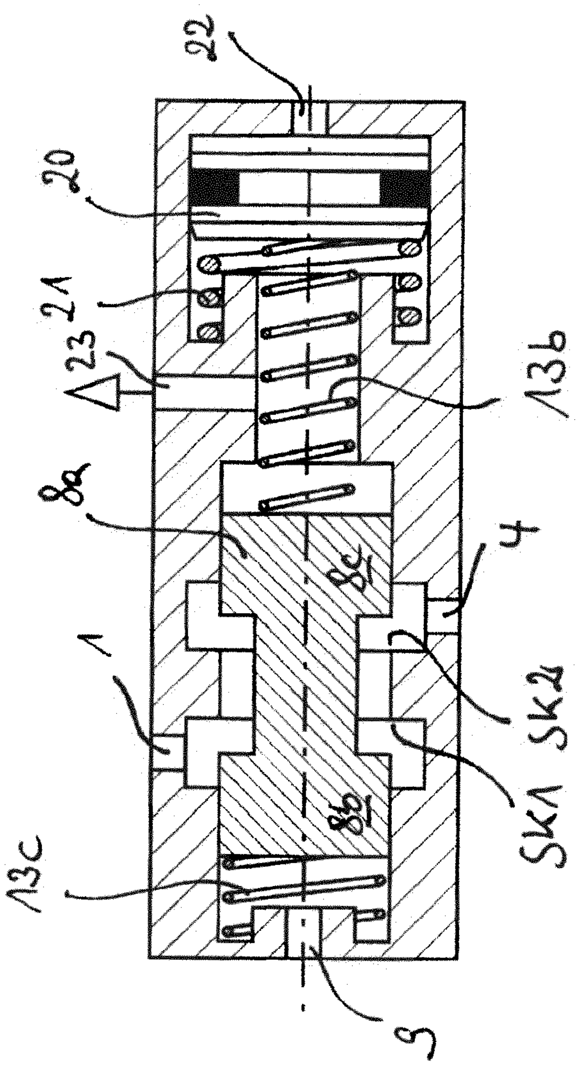

FIG. 6 shows an embodiment in which the embodiment in FIGS. 4*a* and 4*b* was expanded by an integrated minimum pressure application for starting from a depressurized state. In this way, the pressure reducers 11 and 12 shown in the previous FIGS. 2 and 3 and provided for this purpose can be dispensed with.

The piston 20 shown on the right is used to reduce the outlet pressure of the control valve 8 for the minimum pressure application. A spring 21 acts on the piston 20, which, through the borehole 22, is subjected to the pressure regulated by the control valve, thus, in particular, the pressure in the driving chamber 1. The connections 1 and 22 are thus preferably directly connected. The spring 21 is preloaded so that the piston 20 moves to the left only when the outlet pressure of the control valve 8 is sufficient, which is to say when the pressure in the driving chamber 1 has a minimum pressure predetermined by the spring 21. The space in which the springs 13*b* and 21 are disposed is pressure-relieved via the connection 23.

The position of the piston defines the preloading of the springs 13*b* and 13*c*. These define the position of the valve actuator 8*a* both as a function of the control pressure in the line 9 and as a function of the preload thereof, and consequently define the position of the piston 20.

When the piston 20 is situated in the left extreme position, the spring rates and preloads of the springs 13*b* and 13*c* correspond to the nominally required value for the known function of the valve, in particular as was described above. As a result of partial relaxation of the two springs 13*b* and 13*c*, displacement of the piston 20 to the right results in displacement of the valve actuator 8*a* to the right.

With the system in an entirely depressurized state, pressure is present neither in the control line 9 nor downstream from the control valve, which is to say in the borehole 22. The piston 20 is in the right extreme position thereof, loaded by the springs 21 and 13*b*. Due to the displacement of the valve actuator 8*a* to the right, the control valve is consequently opened via the control edge SK2 and the actuating body 8*c*. When pressure is applied to the feed line of the control valve, the valve position described above applies increasing pressure to the regulated volume, which acts via the borehole 22 back on the piston 20. When this pressure reaches the target value, the piston 20 is moved to the left, the valve actuator 8*a* is displaced to the left as a result of the increase in the tension of the springs 13*b* and 13*c*, and the control valve is closed via the control edge SK2 and the actuating body 8*c*.

From this point in time onward, the piston 20 remains in the left extreme position thereof during normal operation of the system, and the function of the valve corresponds to the variant in FIGS. 4*a* and 4*b*. To improve the operating behavior, a spring system 21 made with disk springs can, in particular, be used for loading the piston 20.

Figure 7:
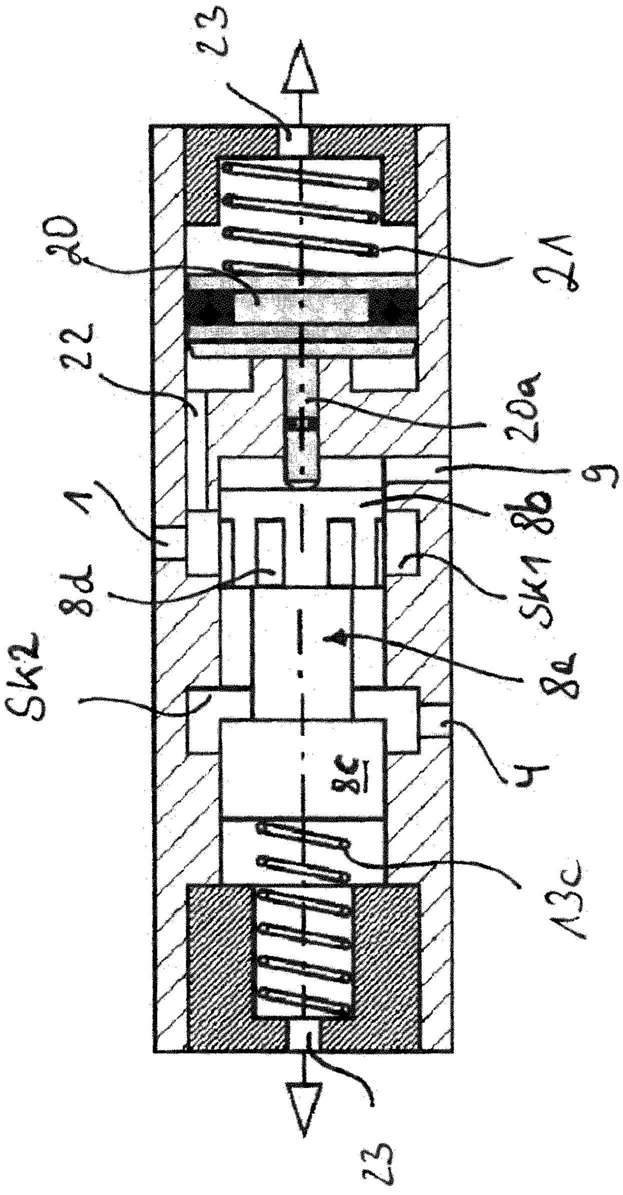

FIG. 7 shows a modification of the embodiments of FIG. 5 and FIG. 6. Unless the functions described there and in FIG. 4 are replaced by functions described hereafter, these also apply to the embodiment of FIG. 7.

In a modification of FIG. 6, the piston 20, in this embodiment, no longer acts via a resilient spring 13*b*, but acts rigidly here, via the piston rod 20*a*, on the valve actuator. The cooperation of the piston 20 and the spring 21 is reversed in terms of the direction here. Again, the space in which the spring 21 is disposed is pressure-relieved via the connection 23. Here, the piston 20 is accordingly subjected to the pressure of the connection 1, from the direction of the valve interior, for example via the line 22, which connects the space to the left of the piston 20 to the connection 1, preferably inside the valve.

As in FIG. 5, the limit pressures and the slopes of the opening characteristics of the two control edges can be decoupled from one another as a function of the control pressure. However, here, this does not take place by the springs 13*b* and 21 disposed inside one another, but as differs therefrom by the implementation of opening cross-sections that differ as a function of the position, in the action between a control edge, here the control edge SK1, and the valve actuator 8*a*, in particular in the case of an actuating body, here the actuating body 8*b* of the valve actuator 8*a*. According to the invention, this manner of influencing the characteristics via opening cross-sections that differ as a function of the position can be carried out independently of the further specific illustrated designs of the valve 8.

So as to implement these position-dependent opening cross-sections, an actuating body, for example here the actuating body 8*b*, can, for example, include axially extending control grooves 8*d* in the surface thereof, which extend only regionally in the axial direction, which is to say, not completely across the surface. In this example, the control grooves 8*d* end before of the right axial end of the actuating body 8*b*.

As differs from FIGS. 5 and 6, application of control pressure here preferably takes place via the connection 9, onto the axial end face of the right actuating body 8*b* on which the piston rod 20*a* also acts. The action occurs against the spring 13*c* on the other side of the valve actuator 8*a*, which is disposed in a space that is pressure-relieved via the connection 23. The movement of the valve actuator 8*a* is reversed in the embodiment of FIG. 7, compared to FIGS. 5 and 6.

The invention claimed is:

1. A gas-powered drive system,comprising a drive comprising a first chamber and a second chamber, which are separated from one another by a movable work element of the drive, the first chamber being configured to be connected to a gas source to form a chamber configured to drive the work element, and the second chamber being configured to be connected via an exhaust air throttle to a gas sink by means of a reversing valve, to form a chamber configured to counteract movement of the work element, wherein a control valve is provided to the driving chamber, the control valve being configured so that through the control valve the first chamber can be filled with gas from the gas source, the control valve also being configured so that an opening cross-section of the control valve can be set as a function of a control pressure prevailing upstream from the exhaust air throttle in a flow direction or as a function of a control pressure which is a pressure drop across the exhaust air throttle, the control valve also being configured so that the opening cross-section of the control valve can be increased when the pressure drop across the exhaust air throttle is to below a first limit pressure and can be decreased to close the control valve when the pressure drop across the exhaust air throttle further drops below a second limit pressure.

2. The system according to claim 1, wherein the first limit pressure is greater and the second limit pressure is lower than the pressure that prevails upstream from the exhaust air throttle or the pressure drop across the exhaust air throttle, whereby a supercritical gas flow in the exhaust air throttle can occur.

3. The system according to claim 1, further comprising an electronic or electric controller configured to measure the control pressure and to activate an electrical drive configured to adjust a valve actuator in the control valve as a function of a measured value of the control pressure.

4. The system according to claim 1, further comprising a gas line configured to be a control line which fluidically connects the control valve to the second chamber, the control line being configured so that the control pressure acts, through the control line, on the valve actuator of the control valve, the valve actuator being prestressed by an actuating force and thereby being configured to be displaced as the control pressure falls.

5. The system according to claim 4, wherein the control valve has a characteristic curve that describes a dependence on the opening cross-section of the control valve and the valve actuator displacement, the characteristic curve having a reversing slope at a valve actuator displacement between two extreme possible displacements of the valve actuator.

6. The system according to claim 5, wherein the control valve comprises two control edges configured to cooperate with the valve actuator or wherein a second valve actuator is provided and a respective one of the two control edges is disposed on each of the valve actuators the control edges being configured to increase the opening cross-section of the control valve upon a direction of displacement of the valve actuator which is defined by falling control pressure by cooperation with a first of the two control edges, and to decrease the opening cross-section in the same displacement direction by cooperation with a second of the two control edges until the opening cross-section of the control valve is entirely closed.

7. The system according to claim 4, further comprising respective reversing valves provided in a region of the control line between the control valve and the drive and between the exhaust air throttle and the drive, the reversing valves being configured so that, in a first switched stage, the first chamber can be connected to the control valve and, at the same time, the second chamber can be connected to the exhaust air throttle and, in a second switched stage, the second chamber can be connected to the control valve and, at the same time, the first chamber can be connected to the exhaust air throttle.

8. The system according to claim 1, further comprising a pressure reducer connected in parallel and a check valve that is situated in series, with the exhaust air throttle the pressure reducer and check valve being configured so that the second chamber can be filled with gas while the exhaust air throttle is blocked.

9. The system according to claim 1, wherein characterized in that a respective assembly comprising an exhaust air throttle and a control valve, including a control line connected to the other chamber, is assigned to each of the two chambers, the assemblies being configured so that it is possible for each of the two chambers to be filled with gas by the assigned control valve during a process phase during which the particular chamber acts as a driving chamber, and for each of the two chambers to be emptied by the assigned exhaust air throttle during a process phase during which the particular chamber acts as a counteracting chamber.

10. The system according to claim 9, further comprising a respective pressure reducer, connected in parallel with each of the assemblies, the pressure reducers being configured so that the system can be transferred from a state in which both chambers of each of the assemblies are pressure-relieved into an operating state by filling one of the two chambers with gas by way of the pressure reducer while pressurizing and opening the control valve assigned to the other chamber.

11. The system according to claim 1, wherein the movable work element comprises a piston.

12. A method for operating a gas-powered drive system, the gas-powered drive system comprising a drive comprising a first chamber and a second chamber, which are separated from one another by a movable work element of the drive, the first chamber being connected to a gas source to form a chamber configured to drive the work element and the second chamber being connected via an exhaust air throttle to a gas sink by means of a reversing valve to form a chamber configured to counteract movement of the work element, the method comprising assigning a control valve to the driving chamber through which the driving chamber is filled with gas from the gas source and setting an opening cross-section of the control valve as a function of a control pressure prevailing upstream from the exhaust air throttle in a flow direction or a control pressure which is a pressure drop across the exhaust air throttle so that the opening cross-section is increased by way of the control valve when the control pressure drops below a first limit pressure and the opening cross-section is decreased so that the control valve is closed when the control pressure further drops below a second limit pressure.

13. The method according to claim 12, wherein the movable work element of the gas-powered drive system comprises a piston.

* * * * *